United States Patent [19]

Eggleston

[11] 4,190,319
[45] Feb. 26, 1980

[54] FIBER OPTIC RIBBON AND CABLE MADE THEREFROM

[75] Inventor: Frederick C. Eggleston, Decatur, Ill.

[73] Assignee: Essex Group, Inc., Fort Wayne, Ind.

[21] Appl. No.: 877,047

[22] Filed: Feb. 13, 1978

[51] Int. Cl.² ............................................. G02B 5/16
[52] U.S. Cl. .............................. 350/96.23; 174/72 TR
[58] Field of Search ................. 350/96.23; 174/72 TR

[56] References Cited

U.S. PATENT DOCUMENTS

| 3,937,559 | 2/1976 | Ferrentino et al. | 350/96.23 |
| 4,138,193 | 2/1979 | Olszewski et al. | 350/96.23 |

FOREIGN PATENT DOCUMENTS

| 2459997 | 6/1976 | Fed. Rep. of Germany | 350/96.23 |
| 2600100 | 7/1976 | Fed. Rep. of Germany | 350/96.23 |
| 2507648 | 9/1976 | Fed. Rep. of Germany | 350/96.23 |
| 2627174 | 12/1977 | Fed. Rep. of Germany | 350/96.23 |
| 1250823 | 10/1971 | United Kingdom | 174/72 TR |

*Primary Examiner*—Stewart J. Levy
*Attorney, Agent, or Firm*—Lawrence E. Freiburger; Robert D. Sommer

[57] ABSTRACT

A ribbon consisting of a plurality of optical channels each of which is situated between two strength members of greater diameter than the optical channels. A sheath surrounds the strength member and optical fibers in such a manner that it is bonded only to the strength members, thus permitting the optical channels to move relative to the strength members. If desired, a cushion tape may be interleaved between the optical channels and strength members to prevent the strength members from abrading the fibers. Further, if desired, the sheath may be formed of two tapes suitably bonded to one another at their longitudinal edges.

A cable made from the optical ribbon of the invention includes a central core around which the ribbon is spirally wrapped and an impact sheath is applied thereover.

9 Claims, 4 Drawing Figures

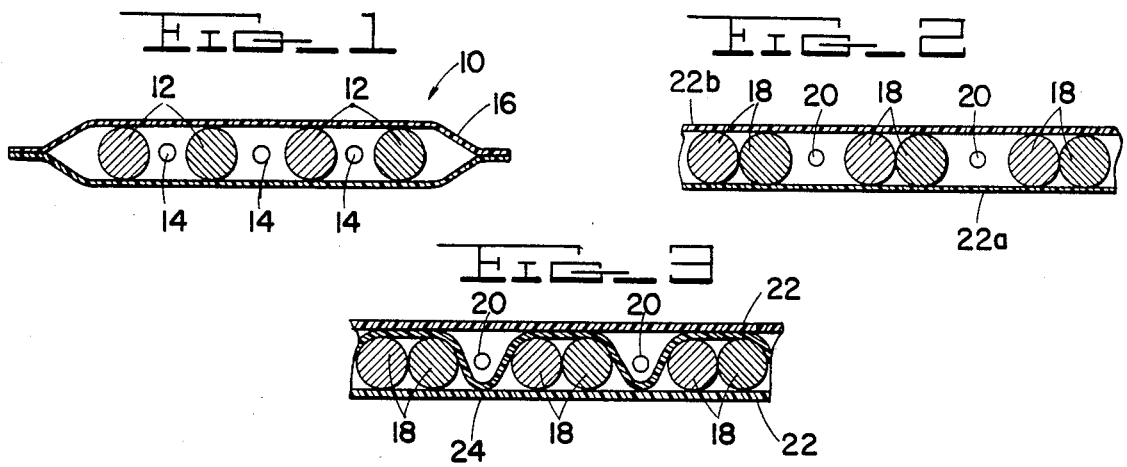
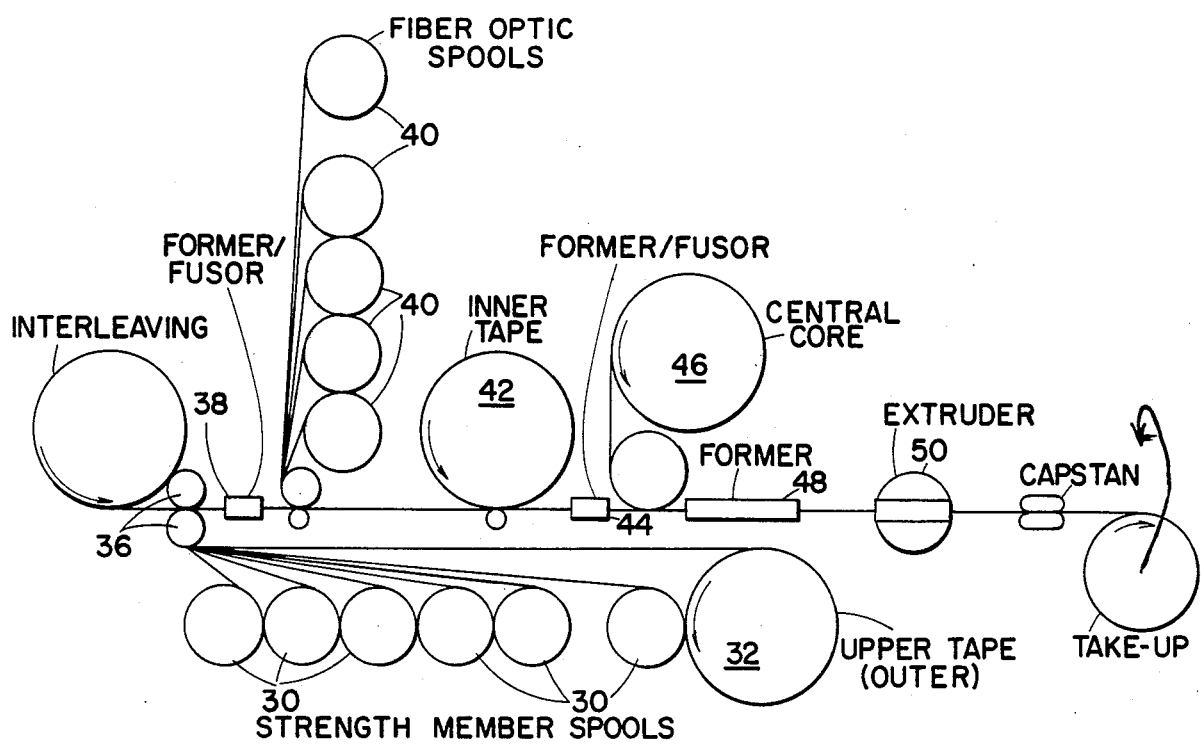

FIBER OPTIC RIBBON AND CABLE MADE THEREFROM

BACKGROUND OF THE INVENTION

It is well known that if optical fibers are unevenly stressed, substantially losses can occur. Accordingly, it is advantageous to prevent stressing of the optical fibers.

It is suggested in U.S. Pat. No. 3,984,172 that stressing the optical fiber can be prevented by utilizing a "loosely coupled" structure between the optical fibers and their sheath to allow the fibers some lateral and longitudinal movement so as to prevent stressing them.

Another method to prevent stressing the optical fibers is to embed them between two thermoplastic films in such a manner that the fibers follow an undulate path. The undulate path allows the ribbon to be elongated. Such a method is illustrated in U.S. Pat. No. 3,937,559.

It is also well known in the prior art to embed optical bundles in an encapsulating medium along with strengthening members of a larger diameter such as shown in U.S. Pat. No. 3,887,265. In this patent, however, the encapsulating medium will necessarily cause the optical bundle to be mechanically coupled to the strengthening members.

In the prior art, it is well known to manufacture an optical cable by spirally wrapping a ribbon of optical fibers around a core and covering the resulting structure with a protective sheath. Typical such optical cables are shown in U.S. Pat. Nos. 3,883,218 and 3,937,559.

One of the main problems with prior art optical ribbons is their inability to withstand both elongating stresses and impacts without damaging the optical fibers. It is desirable to make optical cables on the same machinery used to manufacture electrical cables. However, this is a relatively difficult objective to achieve since the apparatus used to make electric cables is relatively rough in handling the strands which comprise the cable and the optical fibers by themselves are not able to withstand the strains which can be withstood by copper conductors. Further, because of the inability of prior art optical ribbons to withstand abuse imposed upon it by cable making machinery, the quality of prior art optical cables is less than desired.

SUMMARY OF THE INVENTION

The present invention seeks to overcome the disadvantages of prior art optical ribbons, namely to provide an optical ribbon which can withstand excessive axial and transverse forces as well as impacts without damage to the optical fibers contained therein. Thus, the present invention provides an optical ribbon which can be used with conventional electric cable making machinery to manufacture an optical cable without the cable making machinery damaging the optical fibers.

Throughout this specification the term optical channel will be used to denote optical fibers and optical bundles.

In accordance with the present invention, the optical channels are allowed to "float" within the ribbon structure; that is, they are decoupled from any portion of the ribbon. Floating the optical channels is accomplished by situating each channel between two strength members which are larger in diameter than the channels. A suitable sheath surrounds the assembly of the strengthening elements and optical channels and is bonded to the strengthening elements. As a result, if any elongating stress is applied between two points on the ribbon, that portion of the ribbon will elongate in accordance with the physical properties of the strength members, but since the optical channels are free to float, actual elongation of the channels will take place over a greater distance. Thus, the effect of elongating stresses applied to the ribbon is reduced with respect to the actual channels. Further inasmuch as the strength members are of greater diameter than the channels, any impact forces on the ribbon are absorbed by the strength members. Depending upon the strength members and the type of service the ribbon will undergo, it may be desirable to interleave a cushion tape between the channels and the strength members to prevent the strength members from abrading the surface of the fibers.

The ribbon structure of the invention provides an additional advantage in manufacture not provided for in the prior art. If two strength members are employed in a side by side relation and because the sheath is bonded securely to the strength members it is possible to make a ribbon in large widths and longitudinally slit it between two of the strength members into smaller widths.

BRIEF DESCRIPTION OF THE DRAWINGS

In the course of the detailed description of the invention, reference will be made to the drawings in which:

FIG. 1 is a cross sectional view of an optical ribbon in accordance with the present invention;

FIGS. 2 and 3 are cross sectional views of alternate embodiments of an optical ribbon of the invention; and FIG. 4 is a diagrammatic representation of an in-line apparatus for making an optical ribbon and optical cable in accordance with the present invention.

DESCRIPTION OF THE PREFERRED EMBODIMENT OF THE INVENTION

Referring now to FIG. 1 an optical ribbon 10 in accordance with the present invention preferably comprises a plurality of elongated coplanar strengthening members 12 and optical channels 14 arranged so that each optical channel 14 is situated between at least two strengthening members. As stated above, the optical channels 14 each consist of one or more optical fibers, at least some of which are constructed of a high modulus material. The ribbon assembly is held together by a sheath 16 which is bonded to each of the strengthening members but not the optical channels because the strengthening members are larger in diameter than the optical channels.

As pointed out above, the strengthening members are necessarily of greater diameter than the optical channels so that the sheath 16 does not bond to the channels. However, the strengthening members also provide protection for the optical channels from crushing blows as well as strength to the ribbon in resisting elongation. It is accordingly necessary that the strength members have a relatively smooth surface so that they do not abrade the optical channels and that they resist flattening so as to protect the optical channels from crushing blows. In addition, the strengthening members should be resilient longitudinally, elastic, and have a Young's modulus which is high among available materials. Suitable materials for the strengthening members which are contemplated are brass coated steel wire (more commonly known as hose wire), fiberglass reinforced resin, aramid fibers one of which is a fiber sold under the trademark KEVLAR by DuPont, and plastic monofilament line. In addition, alumina, graphite or boron fibers could be used for the strengthening members, but because of their relative expense are not preferred. Strengthening members comprised of a dielectric material have the additional advantage that they do not carry electrical interference signals. In addition, since the optical channels are separated by the strength members, the strength members provide a barrier to crosstalk between the channels.

The optical channels 14 are preferably glass clad fibers because water does not affect their performance whereas water may affect plastic clad optical fibers. It is also contemplated plastic core-plastic clad or plastic clad silica optical fibers as well as crystalline type optical fibers could be used if the environment and/or application permitted. Further, bundles of these optical fibers may comprise the optical channels if desired.

The sheath surrounding the optical ribbon is preferably formed in a lamination process by bonding an upper and lower tape to one another at their edges and to the strengthening members. If desired, the ribbon sheath could be formed by an extrusion process, although the laminating process is more amenable to formation of the optical ribbon in line with a cable manufacture process. Preferably, the laminating tapes are polymeric tapes coated with thermally or pressure activated adhesive. In addition, organic elastomeric tapes and metal foil tapes coated with a suitable thermally or pressure activated adhesive are contemplated as materials from which the laminating tapes for the sheath 16 may be made.

The void between strength members in which the optical channel is situated is filled with a low shear strength, low viscosity fluid such as air. However, if desired, it may be partially or completely filled with other fluids, one of which is a silicone fluid to retard the egress of moisture and improve relative movement.

FIGS. 2 and 3 illustrate alternate forms of the invention in which a pair of elongated strengthening members 18 are situated between two optical channels 20. In the same manner, as illustrated in FIG. 1, a sheath 22 consisting of tapes 22a and 22b surrounds and is bonded to the strengthening members. As will be apparent from FIGS. 2 and 3, the optical ribbon may be constructed in relatively wide widths and longitudinally slit between a pair of strength members to provide an optical ribbon of the desired width and number of discrete optical channels. Preferably the adjacent strength members are spaced slightly from one another to facilitate slitting of the ribbon.

In FIG. 3 an additional cushioning tape 24 is interleaved between the optical channels 20 and the strength members 18. Cushion tape 24 is provided if the surface of strength members 18 is likely to abrade the optical channels 20. Cushion tape 24 is preferably a polymeric material and is bonded to the strength members 18 and sheath 22, but not optical fibers 20. Cushion tape 24 in addition to providing abrasion protection may act as an optical shield to provide additional protection against crosstalk between fibers. It is necessary that cushion tape 24 be at least slightly resilient and that the surface in contact with the optical channel allow the fiber to move freely relative to it. If desired, the cushion tape may be colored with a suitable pigment to provide a color coding for the ribbon.

In FIG. 4 an apparatus for manufacture of the optical ribbon of the invention and an optical cable therefrom is shown in diagrammatic form. At the beginning of the apparatus, the strength members are fed from spools 30, an outer tape is fed from its supply spool 32, and a cusion tape or interleaving is fed from its supply spool 34, through a pair of rollers 36 and through a former/fusor station 38 where the cushion tape is formed and bonded around the strength members to form depressions between them which will eventually receive the optical channels, and the outer tape is suitably bonded to the strength members. It will be apparent to those skilled in the art that the interleaving is eliminated if the cushion tape is not needed. After the initial former/fusor station 38, the optical channels are fed from spools 40, an inner tape is fed from spool 42 through a second former/fusor 44 which bonds the inner tape to the strength members and the outer tape. After passing through former 44, the optical ribbon is completed. A cable central core is fed from supply spool 46 along with the optical ribbon to a former station 48 at which the ribbon is wrapped spirally around the core. The core and optical ribbon wrapped helically therearound then passes through an extruder 50 which applies a jacket to the cable. After exiting from extruder 50, the optical cable passes through a traction capstan into a take-up reel which rotates around the optical cable to cause the optical ribbon to spiral around the central core at former 48.

The cable central core should be of relatively large tensile strength and a diameter which is determined by the lay angle of the ribbon. In addition, the central core should be resilient to some extent. A suitable material for the core has been found to be Fiberglass or PRD in Resin Matrix.

A preferred form of the invention has been described herein. Obvious modifications of the invention will most likely occur to those skilled in the art. It is intended that the claims cover these modifications.

What is claimed is:

1. An optical ribbon, comprising:
   pair of parallel, elongated, substantially co-planar strength members extending parallel to the axis of said ribbon;
   an optical channel situated in the void between said strength members, said optical channel being located in the same plane as said strength members and extending parallel to the axis of said ribbon;
   a pair of parallel, elongated polymeric tapes bonded to one another only at their edges so as to form a sheath surrounding said sstrength members and optical channel, said sheath being bonded to said strength members; and
   the relative size of said strength members and said optical channel being such that bonding between said sheath and optical channel is substantially prevented, and the spacing between said strength members being such that said channel is substantially free to move relative to said strength members and sheath.

2. The optical cable as claimed in claim 1, further comprising:
   a cushion tape separating said optical channel from said strength members.

3. The optical ribbon as claimed in claim 2 wherein said cushion tape is bonded to said sheath at its point of contact therewith.

4. An optical ribbon comprising:
   a plurality of pairs of adjacent, parallel substantially coplanar strength members forming a plurality of voids therebetween;

an elongated optical channel located in each such void;

a sheath surrounding said strength members and optical channels, said sheath being bonded to said strength members;

the relative size of said strength members and optical channels being such that bonding between said sheath and optical fibers is prevented and the spacing between said pairs of strength members being such that said optical channels are substantially free to move axially relative to said strength members and said sheath.

5. The optical ribbon as claimed in claim 4, further comprising:

a cushion tape interleaved between said pairs of strength members and said optical channels so as to isolate said optical channels, said cushion tape being bonded to said sheath at each point of contact therewith.

6. The optical ribbon as claimed in claims 4 or 5, wherein said sheath comprises a pair of elongated polymeric tapes bonded to one another at their edges.

7. An optical cable, comprising:

a central core;

at least one optical ribbon spiraled around said core, said at least one optical ribbon comprising a substantially co-planar array of spaced, parallel, elongated strength members and an optical channel located in the void between said strength members, said at least one optical ribbon further comprising a pair of parallel, elongated, polymeric tapes bonded to one another only at their edges so as to form a sheath surrounding said strength members and optical channels, said sheath being bonded to said strength members; and an impact shield surrounding said core and optical ribbon spiraled therearound.

8. The optical channel as claimed in claim 7, further comprising a cushion tape interleaved between said optical channel and said strengthening members.

9. The optical cable as claimed in claim 7, further comprising a cushion tape interleaved between each said optical channel and strengthening members.

* * * * *